US006824578B2

(12) United States Patent
Uchino et al.

(10) Patent No.: US 6,824,578 B2
(45) Date of Patent: Nov. 30, 2004

(54) ABRASIVE MATERIAL

(75) Inventors: Yoshitsugu Uchino, Tokyo (JP); Hidehiko Yamasaki, Tokyo (JP); Shigeru Kuwabara, Tokyo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 10/363,678

(22) PCT Filed: Oct. 2, 2001

(86) PCT No.: PCT/JP01/08671
§ 371 (c)(1),
(2), (4) Date: Mar. 6, 2003

(87) PCT Pub. No.: WO02/31079
PCT Pub. Date: Apr. 18, 2002

(65) Prior Publication Data
US 2004/0010978 A1 Jan. 22, 2004

(30) Foreign Application Priority Data

Oct. 6, 2000 (JP) .................. 2000-307100

(51) Int. Cl.[7] ............... C09K 3/14; C09G 1/02; C09G 1/04
(52) U.S. Cl. ............... 51/307; 51/309; 51/298; 51/303; 106/3; 106/5
(58) Field of Search ............... 51/307, 308, 309, 51/298, 303; 106/3, 5

(56) References Cited

FOREIGN PATENT DOCUMENTS

| JP | 56-45975 A | 4/1981 |
|----|------------|--------|
| JP | 56-147880 A | 11/1981 |
| JP | 45826 A1 | 2/1982 |
| JP | 3-146585 A | 6/1991 |
| JP | 6-330025 A | 11/1994 |
| JP | 9-143455 A | 6/1997 |
| JP | 2000-63806 A | 2/2000 |
| JP | 2000-173955 A | 6/2000 |
| JP | 2000-256656 A | 9/2000 |
| JP | 2000-351956 A | 12/2000 |

*Primary Examiner*—Michael Marcheschi
(74) *Attorney, Agent, or Firm*—Rothwell, Figg, Ernst & Manbeck, P.C.

(57) ABSTRACT

A polishing material is provided in which the dispersibility of the abrasive grains of the polishing material having, as a major component, rare earth oxides including cerium oxide is made better and the hardness of abrasive grain precipitates is reduced, and at the same time high efficiency of polishing can be achieved stably. According to the present invention, in a polishing material having, as the major component, rare earth oxides including cerium oxide, any one of crystalline cellulose, calcium secondary phosphate, a condensate of sodium β-naphthalenesulphonate and formalin, and synthetic silica is contained as an anti-solidification agent capable of softening abrasive grain precipitates of the polishing material when the abrasive grains of the polishing material are dispersed into a dispersion medium, and sodium hexametaphosphate or pyrophosphate is contained as a dispersant capable of dispersing the abrasive grains of the polishing material into the dispersion medium.

4 Claims, No Drawings

ABRASIVE MATERIAL

CROSS REFERENCE TO RELATED APPLICATION

The present application is a national stage filing under 35 U.S.C. §371 of PCT/JP01/08671 filed on Oct. 2, 2001, and designating the U.S.

TECHNICAL FIELD

The present invention relates to a polishing material, and particularly to additives contained in constituting a polishing material having, as a major component, rare earth oxides including cerium oxide, composing such a polishing material.

BACKGROUND ART

Recently, glass materials are widely utilized, and used in numerous areas such as not only optical lens applications, but also optical and magnetic disc applications, color filters for liquid crystals, LSI photomasks, and others. Glass; materials for these applications require the smoothness of the surface with strictly high accuracy, and therefore polishing materials having, as the major component, rare earth oxides including cerium oxide have been conventionally employed for processing their surface.

These polishing materials having, as the major component, rare earth oxides including cerium oxide are generally used in a slurry state, in which the abrasive grains of a polishing material are dispersed into a dispersion medium such as water. When a polishing material in this slurry condition is allowed to stand, the dispersoid, abrasive grains of the polishing material, is easily separated from the dispersion medium, causing a phenomenon of precipitation.

In addition, polishing materials are used with cycling, so that the abrasive grains themselves will be ground and a glass component of a substrate to be polished will be included, and when the abrasive grains are precipitated, the precipitates tend to become very hard.

Such separation and precipitation of the abrasive grains will disable the composition of a slurry having a given concentration or the concentration from being maintained while use with cycling, thereby decreasing the efficiency of polishing. When the abrasive grain precipitates become hard, the abrasive grains tend to readily adhere onto the glass surface of a substrate to be polished, and operations are required for removing the abrasive grains from the glass surface; so-called washing property on the glass surface will be thus impaired. Furthermore, the hardening of the abrasive grain precipitates tends to result in a clogged polishing pad, which will be also a cause of forming scratches on the surface of a substrate to be polished.

Under the present condition, the above described problems in polishing glass materials are also pointed out for chemical mechanical polishing (CMP) conducted in a semiconductor manufacturing process.

In order to solve the problems of abrasive grain precipitates in a polishing slurry as described above, many proposals have been conventionally made for additives contained in constituting a polishing material.

For example, as additives for preventing abrasive grain precipitates from hardening, there have been proposed ammonium phosphate salt (Japanese Patent Application Laid-Open No. 56-147880) and phosphate salts of rare earth metals (Japanese Patent Application Laid-Open No. 56-45975), magnesium chloride (Japanese Patent Application Laid-Open No. 3-14658:5), calcium compounds (Japanese Patent Application Laid-Open No. 6-330025), amino acids and amines (Japanese Patent Application Laid-Open No. 10-183104).

These additives for polishing materials are effective in terms of redressing the hardness of the abrasive grain precipitates, but not sufficiently satisfactory in terms of the dispersibility of the abrasive grains in a dispersion medium and the accompanying efficiency of polishing. Accordingly, further improvement is needed in the present circumstances.

DISCLOSURE OF THE INVENTION

Therefore, the present invention aims at providing a polishing material capable of not only improving dispersibility of abrasive grains of the polishing material and reducing hardness of abrasive grain precipitates, but also stably achieving high efficiency of polishing.

In order to solve the above-mentioned problems, the inventors have investigated additives for polishing materials, and have found that a well-balanced polishing material as a whole with respect to characteristics required as a polishing material is formed by containing two additives, an anti-solidification agent capable of softening abrasive grain precipitates of a polishing material when abrasive grains of the polishing material are dispersed into a dispersion medium and a dispersant capable of dispersing abrasive grains of a polishing material into a dispersion medium, in a polishing material having, as a major component, rare earth oxides including cerium oxide.

The present invention is characterized by containing simultaneously two additives, an anti-solidification agent and a dispersant, in constituting a polishing material having, as a major component, rare earth oxides including cerium oxide. According to the present invention, when abrasive grains of a polishing material are dispersed into a dispersion medium, the hardening of abrasive grain precipitates of the polishing material is not caused and the dispersibility of the abrasive grains in the dispersion medium becomes better, and high efficiency of polishing can be stably maintained as a result. The polishing material according to the present invention can be widely applied for semiconductors and glass material and is especially effective as a polishing material for glass materials.

Conventionally known anti-solidification agents can be employed in the present invention, however the present inventors' research revealed it is preferable to employ one selected from the group consisting of cellulose and cellulose derivatives, silicas, alginic acid and alginic acid derivatives, aromatic sulfonate formalin condensate salts, and calcium-containing compounds.

The cellulose and cellulose derivatives as anti-solidification agents include cellulose, crystalline cellulose, methylcellulose, ethylcellulose, hydroxyethylcellulose, carboxymethylcellulose, carboxymethylcellulose ammonium, alkaline metal salts and alkaline earth metal salts of carboxymethylcellulose.

The silicas as anti-solidification agents include synthetic silica, colloidal silica, fumed silica. The alginic acid and alginic acid derivatives include sodium alginate, propylene glycol ester of alginic acid. The aromatic sulfonate formalin condensate salts include sodium β-naphthalene sulfonate formalin condensate. In addition, the calcium-containing compounds include calcium sulfate, calcium hydroxide, calcium secondary phosphate.

In addition, the following substances can provide the effect similar to that obtained by the above described anti-solidification agents.

Proteins and polypeptides (for example, glue, gelatins, albumin, casein) and starch and starch derivatives (for example, heat-treated or alkaline-treated potato starch and cornstarch, carboxymethyl starch, dimethylamino starch) can be employed. In addition, iron salts (for example, ferric sulfate, ferrous sulfate, ferric chloride, ferrous chloride) and aluminum compounds (for example, aluminum sulfate, polyaluminum chloride, sodium aluminate) can also be employed. Organic high-molecular flocculants can also be employed as anti-solidification agents of the present invention. For example, polyacrylamide, poly(acrylamide/acrylate) copolymer, polyethyleneimine, polyvinylbenzyltrimethylammonium chloride, polymethacrylate N,N-diemethylaminoethyl ester salts, methacrylate N,N-diemethylaminoethyl ester salt/acrylamide copolymer, polymethacrylate trimethylammonioethyl ester salts, polymethacrylate trimethylammonioethyl ester salt/acrylamide copolymer, N,N-dimethylaminomethylene acrylamide/acrylamide copolymer, polydiallyldimethylammonium chloride, diallyldimethylammonium chloride/acrylamide copolymer, 2-vinylimidazoline polymer sulfate, vinylpyridine copolymer salts, dicyandiamide-formaldehyde polycondensate salts can be mentioned. In addition, hydrogencarbonates, lignin sulfonate, polyvinyl alcohol, water-born urethane resin, gum arabic, and chitosan can be employed.

According to the research by the present inventors, it is more preferable to use any one of crystalline cellulose, calcium secondary phosphate, and sodium β-naphthalene sulfonate formalin condensate among the above described anti-solidification agents of the present invention.

Crystalline cellulose herein is a fine powder obtained by selecting refined pulp with particularly high purity, hydrolyzing it with a mineral acid under predetermined conditions, and then washing and removing noncrystalline regions formed by the cellulose molecule, followed by grinding, purifying and drying. The inventors have found that when this crystalline cellulose as an anti-solidification agent is added to a polishing material having, as the major component, rare earth oxides including cerium oxide, aggregation between the abrasive grains of a polishing material is reduced, and the abrasive grains can be precipitated in a relatively soft condition, whereby the hardening of the abrasive grain precipitates is efficiently prevented.

According to the research by the inventors, furthermore, it has turned out that each of calcium secondary phosphate, a condensate of sodium β-naphthalenesulphonate and formal in, and synthetic silica also serves as an anti-solidification agent having an effect similar to that of crystalline cellulose. Synthetic silica for use in the present invention means water-containing amorphous silicon dioxide synthesized by wet processes, and has a very high porosity due to possessing of a network structure in which minute spherical particles are chemically linked in three dimensions.

When these anti-solidification agents are added, the hardening of abrasive grain precipitates is effectively prevented, washing property is improved, the clogging of a polishing pad is suppressed, and the occurrence of scratches on the surface of a substrate to be polished is reduced to a great extent. However, in case of containing these anti-solidification agents alone in a polishing material, although the hardening of abrasive grain precipitates will be prevented, there is a tendency to reduce the dispersibility of the abrasive grains in a dispersion medium, and the efficiency of polishing is decreased. In the present invention, therefore, in order to suppress a decrease in the efficiency of polishing, a dispersant is added at the same time.

Although so-called surfactants that activate the surface of abrasive grains can be employed as a dispersant in the present invention, according to the research by the inventors, it is preferable to employ one selected from the group consisting of condensed phosphoric acid and condensed phosphates, polystyrene sulfonate salts, polycarboxylate type high-molecular compounds, polyoxyethylene sorbitan fatty acid esters, and polyoxyethylene sorbitol fatty acid esters.

The condensed phosphoric acid and condensed phosphates include pyrophosphoric acid, sodium pyrophosphate, sodium tripolyphosphate, sodium hexametaphosphate, and the like. The polystyrene sulfonate salts include sodium polystyrene sulfonate. The polycarboxylate type high-molecular compounds include polyacrylic acid, polymaleic acid, acrylic acid/maleic acid copolymer, polyacrylate salts, polymaleate salts, acrylic acid/maleic acid copolymer salts, and the like.

The polyoxyethylene sorbitan fatty acid esters include polyoxyethylene sorbitan mono coconut fatty acid ester, polyoxyethylene sorbitan monolaurate, polyoxyethylene sorbitan monopalmitate, polyoxyethylene sorbitan monostearate, polyoxyethylene sorbitan tristearate. The polyoxyethylene sorbitol fatty acid esters include tetraoleate polyoxyethylene sorbit.

In addition, the following substances can provide the effect similar to that obtained by the above described dispersants.

Alkyl sulfate ester salts (for example, sodium lauryl sulfate, ammonium lauryl sulfate, triethanolamine lauryl sulfate) and higher alcohol sulfuric ester salts such as higher alcohol sulfuric ester sodium salt, and polyoxyethylene alkylether sulfuric ester salts (for example, sodium polyoxyethylene laurylether sulfate, triethanolamine polyoxyethylene alkylether sulfate) can also be employed. Polyoxyethylene alkylethers (for example, polyoxyethylene laurylether, polyoxyethylene cetylether, polyoxyethylene stearylether), polyoxyethylene alkenylethers such as polyoxyethylene oleylether, and polyoxyethylene higher alcohol ethers can be employed. Polyoxyethylene alkylphenylethers (for example, polyoxyethylene octylphenylether, polyoxyethylene nonylphenylether), polyoxyethylene alkylenephenylehter, and polyoxyethylene derivatives can be employed. In addition, polyoxyethylene alkylamines, alkyl alkanol amides, alkylamine salts (for example, coconut amine acetate, stearyl amine acetate), amine oxides such as lauryl dimethyl amine oxide, alkyl betaine or its analogues (for example, lauryl betaine, stearyl betaine, 2-alkyl-N-carboxymethyl-H-hydroxyethyl imidazolinium betaine) can be employed.

Among the above described dispersants of the present invention, it is particularly preferable to use sodium; hexametaphosphate and sodium pyrophosphate, and these compounds improves dispersibility of abrasive grains in a dispersion medium to enable effective improvement of polishing efficiency.

The polishing material of the present invention may contain the above described anti-solidification agents and dispersants in any combination. It is the most effective to contain crystalline cellulose as an anti-solidification agent and sodium hexametaphosphate as a dispersant in combination in a polishing material, and the present inventors have confirmed that the combination is excellent as a polishing material especially for glass materials.

In addition, the polishing material in the present invention is preferably such that each of the above described anti-solidification agent and dispersant is contained at 0.02 to 2.0% by weight. When the content of each of the anti-solidification agent and dispersant is less than 0.02% by weight, it is impossible to soften abrasive grain precipitates, the dispersibility of the abrasive grains in a dispersion medium is deteriorated as well, and the efficiency of polishing is decreased. On the other hand, an anti-solidification agent above 2.0% by weight allows softening abrasive grain precipitates, but tends to reduce the efficiency of polishing, while a dispersant above 2.0% by weight results in a better dispersibility of the abrasive grains, but tends to harden abrasive grain precipitates.

That is, by containing each of the anti-solidification agent and dispersant at percentages of 0.02 to 2.0% by weight, both additives work together efficiently, so that high efficiency of polishing can be achieved.

In the polishing material having, as the major component, rare earth oxides including cerium oxide according to the present invention, there is no limitation, particularly on the content of cerium oxide in the polishing material. It is not preferable if the ratio of cerium oxide ($CeO_2$)/total rare earth oxides (TREO) exceeds 99%, because expensive and high-purity materials are required for raw materials, and the resulting polishing material will be expensive as well. On the other hand, at ratios of cerium oxide ($CeO_2$)/total rare earth oxides (TREO) less than 40%, it is not preferable, since polishing values are reduced to a great extent. Therefore, it is desirable that the ratio of cerium oxide ($CeO_2$) to the total rare earth oxides (TREO) in a polishing material is 40 to 99%.

The above described polishing material according to the present invention can be dispersed into a water-born dispersion medium and used as an abrasive slurry, but the method to produce the abrasive slurry of the present invention is not particularly limited. In other words, the abrasive slurry of the present invention may be prepared by preparing abrasive powder and powder containing an anti-solidification agent and a dispersant separately in advance, mixing the powders, and then dispersed into a water-born dispersion medium such, as water or a mixture of water and water-soluble organic solvent. In this case, it is preferable to mill an anti-solidification agent and a dispersant into a size similar to that of an abrasive powder grain so as to proceed mixing of the powders sufficiently. The abrasive slurry of the present invention can also be prepared by charging an anti-solidification agent and a dispersant directly into an abrasive slurry in a process of producing an abrasive before making abrasive powder, drying to obtain abrasive powder containing the anti-solidification agent and the dispersant, and dispersing the abrasive powder in a water-born dispersion medium.

In addition, the abrasive slurry of the present invention can be also prepared by charging an anti-solidification agent and a dispersant in a water-born dispersion medium such as water or a mixture of water and water-soluble organic solvent to prepare an additive solution and adding abrasive powder to the additive solution. Further, the abrasive slurry of the present invention can also be prepared by dispersing abrasive powder in a water-born dispersion medium in advance, then charging an anti-solidification agent and a dispersant in the dispersion, or simultaneously charging abrasive powder, an anti-solidification agent, and a dispersant in a water-born dispersion medium. As described above, the order of mixing abrasive powder or slurry abrasive, an anti-solidification agent, and a dispersant or technique therefor is not particularly restricted in preparation of the abrasive slurry of the present invention.

BEST MODE FOR CARRYING OUT THE INVENTION

Preferred embodiments of the present invention will be explained below.

As a polishing material in the present invention was used one manufactured by the following procedures. First, 20 kg of a concentrate bastnaesite having 70% of TREO and 50% of $CeO_2$/TREO, and 20 l of pure water were milled for 5 hours in a wet-typed ball mill (a volume of 50 l) with 120 kg of steel balls having a diameter of 5 mm, and this milling process was carried out for 10 batches to prepare a large amount of powder slurry. The powder of this powder slurry had an average grain diameter of 0.9 μm. A cerium oxide-based polishing material was manufactured by treating the powder with hydrochloric acid having a concentration of 1 mol/l and washing with pure water, followed by filtration to obtain a cake, which in turn was dried and then roasted in a stationary furnace at 950° C. for 5 hours, followed by re-milling and classifying. The cerium oxide-based polishing material obtained in this way had a cerium oxide ($CeO_2$)/total rare earth oxides (TREO) of 50%.

First Embodiment: This first embodiment is directed to cases where in the cerium oxide-based polishing material obtained as described above, the anti-solidification agent utilizes crystalline cellulose, and the dispersant utilizes sodium hexametaphosphate. In these cases, the dispersion medium in making a polishing slurry uses pure water, and crystalline cellulose that is an anti-solidification agent uses one under the trade name of "Avicel" (manufactured by Asahi Chemical Industry, Co., Ltd.).

At first, three polishing materials were manufactured; one in which no additive was added to the manufactured cerium oxide-based polishing material (Comparative Example 1), one in which only an anti-solidification agent was added (Comparative Example 2), and one in which only a dispersant was added (Comparative Example 3), to carry out their characteristic evaluation, whose results are explained as follows. With respect to the characteristic evaluation, abrasive slurries of Comparative Examples 1 to 3 were prepared, and the polishing test, hardness test of settled cakes, and washing test were carried out to examine their characteristics. For Comparative Examples 2 and 3, abrasive slurries were manufactured, varying the content of the anti-solidification agent or dispersant in the polishing material at 0.1 wt %, 1.0 wt %, 2.0 wt %, to carry out their evaluation. Abrasive slurries were made and used by adjusting the concentration of the polishing material in a polishing slurry employed for the characteristic evaluation to be at 5 wt % in each evaluation (hereinafter, all the polishing slurries in this embodiment were used by adjusting the concentration of the polishing material to be at 5 wt %).

Table 1 shows the results of the polishing test when Comparative Examples 1 to 3 were used. The polishing test was carried out using an Oscar-typed polishing test machine (a model HSP-2I manufactured by Taito Seiki Co., Ltd.)., Regarding polishing conditions, blue sheet glass was polished as a substrate to be polished, employing a felt polishing pad. Polishing was performed for 10 minutes under the polishing condition where an abrasive slurry was supplied at a rate of 25 ml/min., the pressure on the polished surface was set at 5.9 kPa(0.06 kg/cm $^2$), and the rotation speed of the polishing machine was 500 rpm.

The characteristic evaluation in the polishing test was made by measuring a decrease in the weight of the blue sheet glass that is a substrate to be polished, and calculating polishing values. The polishing values are values calculated by conversing, as relative values, weight decreases with the polishing materials of Comparative Examples 2 and 3, using as the reference the weight decrease when the blue sheet glass was polished with the polishing material of Comparative Example 1 under the above described condition (the weight decrease of Comparative Example 1 was defined as 100). Therefore, the polishing value is an index indicating that the higher the polishing value is relative to 100, the better the efficiency of polishing is.

TABLE 1

|  |  | Polishing Value (Relative Evaluation) | | | |
| --- | --- | --- | --- | --- | --- |
|  | Content | 0 | 0.1 wt % | 1.0 wt % | 2.0 wt % |
| Comparative Example 1 | No additive | 100 | | | |
| Comparative Example 2 | Crystalline cellulose | | 91 | 81 | 79 |
| Comparative Example 3 | Sodium hexametaphosphate | | 103 | 111 | 112 |

As understood from Table 1, in case of containing only crystalline cellulose that is an anti-solidification agent, it is obviously indicated that there is a tendency to reduce the efficiency of polishing, as compared with Comparative Example 1 having no added additive, and a decrease in the efficiency of polishing becomes remarkable with its increasing content. Incase of containing only sodium hexametaphosphate that is a dispersant, on the other hand, there is a tendency to improve the efficiency of polishing relative to Comparative Example 1, and it has been observed that the efficiency of polishing is improved with its increasing content.

Next, Table 2 shows the results obtained by carrying out the settled-cake hardness test. The settled-cake hardness test is a test in which the hardness of a settled cake is examined by placing a polishing slurry into a given vessel, and forming a settled cake by allowing it to stand for 48 hours to precipitate the abrasive grains of a polishing material. The hardness of a settled cake was examined in five-leveled evaluation values, as relatively compared with the hardness of each of settled cakes, using as the reference the hardness of a settled cake for Comparative Example 1 having no added additive. Specifically, the hardness of a settled cake for Comparative Example 1 was defined as an evaluation value of 3, and the evaluation values are given in five levels, depending on whether a cake has an equivalent hardness, or is softer or harder, as described below Table 2.

TABLE 2

|  |  | Settled Cake Hardness | | | |
| --- | --- | --- | --- | --- | --- |
|  | Content | 0 | 0.1 wt % | 1.0 wt % | 2.0 wt % |
| Comparative Example 1 | No additive | 3 | | | |
| Comparative Example 2 | Crystalline cellulose | | 3 | 2 | 1 |
| Comparative Example 3 | Sodium hexametaphosphate | | 4 | 5 | 5 |

Evaluation values of the settled cake hardness:
1: softer,
2: slightly softer,
3: equivalent,
4: slightly harder,
5: harder.

AS understood from Table 2, Comparative Example 2 clearly displays a tendency for settled cakes to become soft as the content of crystalline cellulose is increased. In case of containing only sodium hexametaphosphate, on the other hand, settled cakes are shown to have a tendency to become very hard.

The following Table 3 shows the results of the washing test. The washing test was carried out by visual observation of stains on the polished surface after carrying out 10 minute polishing under the above described polishing condition, and then immersing the blue sheet glass that is a substrate to be polished, in pure water for 10 minutes, followed by subjecting the glass to water-wash treatment by getting it three times into and out of pure water, and then drying. In the evaluation in the washing test, relative comparison of washing test results for each of the polishing materials was made, using as the reference the washing result for comparative Example 1 having no added additive, to examine its washing property, as in the above described settled-cake hardness test. Specifically, as described below Table 3, the washing result for comparative Example 1 was defined as an evaluation value of 4, and evaluation values are given in six levels, depending on whether a result is equivalent, or better or worse.

TABLE 3

|  |  | Washing Properties | | | |
| --- | --- | --- | --- | --- | --- |
|  | Content | 0 | 0.1 wt % | 1.0 wt % | 2.0 wt % |
| Comparative Example 1 | No additive | 4 | | | |
| Comparative Example 2 | Crystalline cellulose | | 3 | 2 | 2 |
| Comparative Example 3 | Sodium hexametaphosphate | | 4 | 4 | 4 |

Evaluation values in the washing test
1: little or no stain,
2: better,
3: slightly better,
4: equivalent,
5: slightly worse,
6: worse.

As shown in Table 3, in case of containing only crystalline cellulose, there is a tendency for the washing property to become better, as compared with Comparative Example 1, and it has turned out that the washing property can be clearly improved, as the content of crystalline cellulose increases. In case of containing only sodium hexametaphosphate, Comparative Example 3, on the other hand, little improvement in the washing property has been observed.

The following gives an explanation of Examples of the first embodiment. For these Examples, polishing materials were made, varying the content of each of crystalline cellulose and sodium hexametaphosphate, and the above described polishing test, settled-cake hardness test, washing test, and settling test were carried out.

Results of these Examples are shown in Table 4, where the contents of crystalline cellulose and sodium hexametaphosphate are indicated in columns and rows, respectively, and respective results obtained by carrying out the polishing test, settled-cake hardness test, washing test, and settling test are shown for polishing materials at each content. The polishing values, and the evaluation values for the settled cake hardness and washing property in Table 4 are expressed by values determined by relative evaluation using as the reference the results for Comparative Example 1 in which no additive was added, as in Comparative Examples described above.

The settling test was performed to examine settling property by mixing 110 g of each of polishing materials and 2090 g of pure water and stirring them thoroughly to prepare a polishing slurry containing 5 wt % of a polishing material, putting this polishing slurry into a 2000 ml measuring cylinder, and reading a gradation at the interface between the suspension phase and the dispersion medium phase (pure water) in the abrasive slurry. The evaluation values of the settling test are values obtained by measuring the volume of the suspension phase after putting the polishing slurry into a measuring cylinder and allowing it to stand for 60 minutes, and calculating a ratio (%) of the measured suspension-phase volume relative to the whole polishing-slurry volume (2000 ml).

TABLE 4

| Added | | Crystalline Cellulose (wt %) | | | | | | |
|---|---|---|---|---|---|---|---|---|
| Amount | | 0 | 0.02 | 0.1 | 0.5 | 1.0 | 2.0 | 3.0 |
| Sodium | 0 | A | 100 | 96 | 91 | 85 | 81 | 79 | 77 |
| Hexa- | | B | 3 | 3 | 3 | 2 | 2 | 1 | 1 |
| meta- | | C | 4 | 4 | 3 | 3 | 2 | 2 | 1 |
| phos- | | D | 26 | 38 | 52 | 65 | 64 | 55 | 42 |
| phate | 0.02 | A | 102 | 101 | 100 | 123 | 115 | 98 | 79 |
| (wt %) | | B | 3 | 3 | 3 | 2 | 2 | 1 | 1 |
| | | C | 4 | 4 | 3 | 3 | 2 | 2 | 2 |
| | | D | 63 | 91 | 96 | 98 | 97 | 90 | 63 |
| | 0.1 | A | 103 | 102 | 102 | 135 | 122 | 100 | 78 |
| | | B | 4 | 3 | 3 | 2 | 2 | 1 | 1 |
| | | C | 4 | 4 | 4 | 4 | 3 | 2 | 2 |
| | | D | 75 | 93 | 98 | 99 | 97 | 91 | 72 |
| | 0.5 | A | 107 | 105 | 104 | 137 | 125 | 102 | 79 |
| | | B | 4 | 3 | 3 | 3 | 2 | 2 | 1 |
| | | C | 4 | 4 | 4 | 4 | 3 | 2 | 2 |
| | | D | 88 | 96 | 99 | 100 | 99 | 92 | 75 |
| | 1.0 | A | 111 | 108 | 106 | 140 | 127 | 104 | 80 |
| | | B | 5 | 3 | 3 | 3 | 3 | 2 | 2 |
| | | C | 4 | 4 | 4 | 4 | 3 | 2 | 2 |
| | | D | 89 | 97 | 98 | 99 | 97 | 91 | 70 |
| | 2.0 | A | 112 | 110 | 110 | 146 | 132 | 109 | 84 |
| | | B | 5 | 3 | 3 | 3 | 3 | 3 | 3 |
| | | C | 4 | 4 | 4 | 4 | 4 | 3 | 2 |
| | | D | 85 | 95 | 96 | 97 | 96 | 90 | 67 |
| | 3.0 | A | 113 | 113 | 115 | 151 | 137 | 112 | 87 |
| | | B | 5 | 4 | 4 | 4 | 4 | 4 | 3 |
| | | C | 5 | 5 | 5 | 4 | 4 | 3 | 3 |
| | | D | 72 | 77 | 80 | 85 | 79 | 70 | 62 |

Row A: polishing values, Row B: settled cake hardness, Row C: washing property, Row D: ratios (%) of the suspension-phase volume at a period of 60 minutes after making a polishing slurry.

As understood from Table 4, in the case where sodium hexametaphosphate has a content more than 2.0 wt %, although the efficiency of polishing will be improved, there is a tendency to diminish characteristics with respect to the settled cake hardness and washing property. When crystalline cellulose has a content more than 2.0 wt %, on the other hand, the settled cake hardness and washing property will become better, while it has turned out that there is a tendency to reduce the efficiency of polishing. From the results of the settling test indicated in Row D, when the content of sodium hexametaphosphate is 0 wt % or 3.0 wt %, it has been found that the ratio of the suspension-phase volume is decreased, that is, sedimentation tends to occur. Based on these results of the settling test, it has turned out that the content range of sodium hexametaphosphate resulting in a good dispersibility of the abrasive grains of a polishing material in a polishing slurry is 0.02 to 2.0 wt %.

Then, with respect to all the properties of the efficiency of polishing, settled cake hardness, washing property, and dispersibility in the settling test, the inventors examined the content range displaying good properties that are equivalent to or superior to those of Comparative Example 1 having no additive. The content range in which all the respective properties were equivalent or superior, relative to those of Comparative Example 1 in this Table 4 (data of the upper-left corner in Table 4) is the region surrounded by the thick-line frame in Table 4. That is, it has turned out that if crystalline cellulose is contained in the range of 0.02 to 2.0 wt % and sodium hexametaphosphate in the range of 0.02 to 2.0 wt %, totally balanced properties can be achieved concerning the efficiency of polishing, settled cake hardness, washing property, and dispersibility in the settled test. In other words, the cerium oxide-based polishing material containing crystalline cellulose and sodium hexametaphosphate in contents within the content range is excellent as a polishing material.

Next, an explanation is given regarding results of the examination of changes over time in the settling test and polishing test for polishing materials which contain 0.5 wt % of crystalline cellulose and 0.1 wt % of sodium hexametaphosphate. For comparison, a polishing material of Comparative Example 1 having no added additive was also examined.

The examination of changes over time in the settling test was carried out by, after placing each of abrasive slurries in a measuring cylinder under the condition in the above described settling test, subjecting it to the condition which leaves standing, measuring the volume of the suspension phase at each period of 3, 15, 30, 45, and 60 minutes after pouring, and calculating its ratio relative to the total polishing-slurry volume. Table 5 shows ratios (%) of the suspension-phase volume at the time of each measurement.

TABLE 5

| | Settling Time (min.) | | | | |
|---|---|---|---|---|---|
| | 3 | 15 | 30 | 45 | 60 |
| Comparative Example 1 (no additive) | 83 | 44 | 32 | 29 | 26 |
| 0.5 wt % crystalline cellulose + 0.1 wt % sodium hexametaphosphate (%) | 100 | 100 | 100 | 100 | 99 |

As shown in Table 5, in Comparative Example 1 in which no additive was added, it has turned out that as the settling time is increased, the volume of the suspension phase is correspondingly reduced, and earlier precipitation takes place. That is, it has been proved that in polishing materials having no added additive, when polishing operations are carried out continuously, aggregation between abrasive grains is caused, resulting in the precipitation of a polishing slurry, so that a decrease in the efficiency of polishing is brought about. In a polishing material in which 0.5 wt % of crystalline cellulose and 0.1 wt % of sodium hexametaphosphate were added, on the other hand, it was observed that the state where the ratio of the suspension-phase volume was 100% was maintained after it was poured, and even after a lapse of 20 minutes, the state was kept where the abrasive grains of a polishing material were well dispersed in a polishing slurry, and their precipitation proceeded very slowly.

Table 6 shows the results of the examination of changes over time in the polishing test. The changes over time were examined by determining an amount decreased in the weight by means of polishing five successive plates of blue sheet glass which were weighed before polishing under the same condition as those of the above described polishing test, and measuring the weight of each plate of blue sheet glass after polishing. In Table 6, the efficiency of polishing is expressed by values to which, when the amount decreased in the weight of the first plate of blue sheet glass with Comparative Example 1 is defined as 100, amounts decreased in the weight of the other plates are converted as relative values. Accordingly, values exceeding 100 in Table 5 indicate that amounts decreased of the blue sheet glass by polishing are greater than that of the first plate of Comparative Example 1, and the efficiency of polishing is high.

TABLE 6

| | Plate Number | | | | |
|---|---|---|---|---|---|
| | 1 | 2 | 3 | 4 | 5 |
| No Additive | 100 | 93 | 90 | 86 | 84 |
| 0.5 wt % crystalline cellulose + 0.1 wt % sodium hexametaphosphate | 135 | 136 | 135 | 134 | 135 |

As shown in Table 6, a polishing material of Comparative Example 1 having no additive added has a tendency to reduce the efficiency of polishing over time, as the number of processed plates of blue sheet glass is increased. In a polishing material which contains 0.5 wt % of crystalline cellulose and 0.1 wt % of sodium hexametaphosphate, on the other hand, it has turned out that even if the number of processed plates of blue sheet glass is increased, there is hardly any change in the efficiency of polishing, and thus a high efficiency of polishing can be achieved stably.

Then, the results of evaluation conducted after changing the method of producing the abrasive slurries will be explained. The abrasive slurries used in Tables 1 to 6 described above were prepared by mixing abrasive powder with an anti-solidification agent and a dispersant in advance, then disperse the mixture into pure water to make slurry. The abrasive slurries evaluated here were prepared by disperse abrasive powder containing no anti-solidification agent or dispersant into pure water to make a slurry in advance, and then adding crystalline cellulose and sodium hexametaphosphate to the slurry. For the respective evaluations, the polishing test, settled-cake hardness test, washing test, and settling test were carried out as in Table 4. As Evaluation Item E, the results of measurement of the settled-cake height 30 days later by the settling test for Evaluation Item D are also shown. For Evaluation E, the results are expressed in a relative value calculated based on the height of the settled cake containing no crystalline cellulose or sodium hexametaphosphate (0 wt % in Table 7) 30 days later assuming as 100. The results of evaluations shown here are obtained only for the case where crystalline cellulose and sodium hexametaphosphate were added in the same amount. The results are shown in Table 7.

TABLE 7

| | Content of crystalline cellulose or sodium hexametaphosphate (wt %) | | | | | | |
|---|---|---|---|---|---|---|---|
| | 0 | 00.2 | 0.1 | 0.5 | 1.0 | 2.0 | 3.0 |
| A | 99 | 100 | 103 | 135 | 130 | 107 | 85 |
| B | 3 | 3 | 3 | 3 | 3 | 3 | 3 |
| C | 4 | 4 | 4 | 4 | 3 | 3 | 3 |
| D | 29 | 92 | 98 | 100 | 96 | 92 | 59 |
| E | 100 | 360 | 410 | 430 | 440 | 420 | 210 |

From a comparison between the results in Table 7 and those in Table 4, it was confirmed that the difference in procedure to prepare an abrasive slurry did not largely affect the results of the polishing test, settled-cake hardness test, washing test, or settling test with respect to the polishing material shown in the first embodiment.

Second Embodiment: In this second embodiment, an explanation of cases where the anti-solidification agent utilized calcium secondary phosphate, a condensate of sodium β-naphthalenesulphonate and formalin, and synthetic silica, and the dispersant utilized sodium pyrophosphate will be given. In this second embodiment, the calcium secondary phosphate used was a guaranteed reagent, the condensate of sodium β-naphthalenesulphonate and formalin used was a product under the trade name of "Lavelin" (manufactured by Dai-ichi Kogyo Seiyaku Co., Ltd.), and the synthetic silica used was a product under the trade name of "Carplex" (manufactured by Shionogi & Co., Ltd.).

In this second embodiment, the above described cerium oxide-based polishing materials were employed to make polishing materials containing 1.0 wt % of each of anti-solidification agents and 0.5 wt % of sodium hexametaphosphate as dispersant, and polishing materials containing 1.0 wt % of crystalline cellulose that is an anti-solidification agent and 0.5 wt % of sodium pyrophosphate that is a dispersant for carrying out the polishing test, settled-cake hardness test, washing test, and settling test. Results are shown in Table 8, where data, shown in Examples of the first embodiment, for a polishing material which contains 1.0 wt % crystalline cellulose and 0.5 wt % sodium hexametaphosphate are included for comparison. Polishing values, evaluation values for the settled cake hardness and washing property, and the ratios of the suspension-phase volume shown in Table 6 are those measured in a similar way to what is explained in the first embodiment.

TABLE 8

| Anti-solidification agent (1.0 wt %) | Dispersant (0.5 wt %) | | |
|---|---|---|---|
| Crystalline Cellulose | Sodium Hexametaphosphate | A | 125 |
| | | B | 2 |
| | | C | 3 |
| | | D | 99 |
| Crystalline Cellulose | Sodium Pyrophosphate | A | 119 |
| | | B | 2 |
| | | C | 3 |
| | | D | 98 |
| Calcium Secondary Phosphate | Sodium Hexametaphosphate | A | 128 |
| | | B | 2 |
| | | C | 4 |
| | | D | 97 |
| Sodium β-Naphthalenesulphonate Formalin Condensate | Sodium Hexametaphosphate | A | 118 |
| | | B | 2 |
| | | C | 3 |
| | | D | 98 |
| Synthetic Silica | Sodium Hexametaphosphate | A | 127 |
| | | B | 2 |
| | | C | 4 |
| | | D | 99 |

Row A: polishing value (g),
Row B: settled cake hardness,
Row C: washing property,
Row D: ratio of the suspension-phase volume at a period of 60 minutes after making a polishing slurry.

As shown in Table 8, it has turned out that polishing materials in case of containing calcium secondary phosphate, a condensate of sodium β-naphthalenesulphonate and formalin, and synthetic silica as anti-solidification agent, and sodium hexametaphosphate as dispersant have characteristic data that are almost equivalent to those of polishing materials containing the same amounts of crystalline cellulose and sodium hexametaphosphate. In addition, it has turned out that polishing materials containing crystalline cellulose and sodium pyrophosphate also have characteristics at equivalent levels to those of polishing materials containing sodium hexametaphosphate as dispersant.

Third Embodiment: In the third embodiment, the results of evaluation conducted on the combinations of the anti-solidification agents and the dispersants shown in Table 9 will be described. Regarding evaluation, the polishing test, settled-cake hardness test, washing test, and settling test conducted as in First and Second Embodiments were conducted. The abrasive slurries used for the evaluation were produced in similarly manner to those used for Tables 1 to 6. The results are shown in Table 10.

TABLE 9

|   | Anti-solidification agent (0.3 wt %) | Dispersant (0.3 wt %) |
|---|---|---|
| a | Propylene glycol alginate | Sodium polyacrylate |
| b | Propylene glycol alginate | Sodium hexametaphosphate |
| c | Synthetic silica | Sodium polyacrylate |
| d | Colloidal silica | Acrylic acid/maleic acid copolymer sodium salt |
| e | Colloidal silica | Sodium pyrophosphate |
| f | Crystalline cellulose | Acrylic acid/maleic acid copolymer sodium salt |
| g | Sodium alginate | Sodium polystyrene sulfonate |
| h | Sodium alginate | Sodium hexametaphosphate |
| *i | Crystalline cellulose + Sodium carboxymethylcellulose | Sodium polystyrene sulfonate |
| j | Fumed silica | Polyoxyethylene sorbitan stearate |
| k | Fumed silica | Sodium pyrophosphate |
| l | Sodium β-naphthalene sulfonate formalin condensate | Polyoxyethylene sorbitan stearate |
| m | Crystalline cellulose + carboxymethylcellulose | Tetraoleate polyoxyethylene sorbit |
| n | Propylene glycol alginate | Tetraoleate polyoxyethylene sorbit |

*The weight ratio of crystalline cellulose to sodium carboxymethylcellulose is approximately 9 to 1.

TABLE 10

|   | a | b | c | d | e | f | g |
|---|---|---|---|---|---|---|---|
| A | 120 | 119 | 122 | 121 | 123 | 122 | 120 |
| B | 3 | 3 | 3 | 3 | 3 | 2 | 2 |
| C | 4 | 4 | 4 | 4 | 4 | 4 | 4 |
| D | 96 | 95 | 97 | 95 | 96 | 97 | 95 |

|   | h | I | j | k | l | m | N |
|---|---|---|---|---|---|---|---|
| A | 118 | 125 | 123 | 120 | 120 | 122 | 119 |
| B | 3 | 2 | 3 | 3 | 3 | 3 | 3 |
| C | 4 | 4 | 4 | 4 | 4 | 4 | 4 |
| D | 95 | 98 | 96 | 97 | 95 | 96 | 96 |

The polishing materials containing the anti-solidification agents and dispersants in 14 combinations from a to n shown in Table 9 were evaluated. As a result, as shown in Table 10, it was found that the characteristics of the 14 polishing materials were similar to the characteristic data for the polishing material containing crystalline cellulose and sodium hexametaphosphate in the same amount in First Embodiment.

INDUSTRIAL APPLICABILITY

According to the present invention, the dispersibility of the abrasive grains of a polishing material can be made better and the hardness of abrasive grain precipitates can be reduced, and at the same time a high efficiency of polishing can be achieved stably. That is, according to the present invention, a polishing material with required characteristics of a polishing material with a totally very good balance, particularly extremely excellent as a polishing material is provided.

What is claimed is:

1. A polishing material comprising, as a major component, abrasive grains of cerium oxide and at least one other rare earth oxide, an anti-solidification agent selected from the group consisting of crystalline cellulose, calcium secondary phosphate, and synthetic silica, and a dispersant selected from the group consisting of sodium hexametaphosphate or sodium pyrophosphate, wherein the dispersant is present in an amount effective to disperse the abrasive grains contained in the polishing material into a water-based dispersion medium, and the anti-solidification agent is present in an amount effective to soften the abrasive grains of the polishing material when said abrasive grains are dispersed into said dispersion medium.

2. The polishing material according to claim 1, wherein the polishing material contains 0.02–2.0 weight % of the anti-solidification agent and 0.02–2.0 weight % of the dispersant based on the total weight of the composition.

3. The polishing material according to claim 1, wherein the cerium oxide ($CeO_2$) content is 40 to 99 weight % of the total rare earth oxide (TREO) content.

4. An abrasive slurry comprising the polishing material of claim 1 dispersed into a water-based dispersion medium.

* * * * *